United States Patent [19]
Joseph et al.

[11] Patent Number: 5,078,371
[45] Date of Patent: Jan. 7, 1992

[54] DEVICE FOR THE RESILIENT AND CUSHIONED SUSPENSION OF A LOAD PARTICULARY FOR A VEHICLE

[75] Inventors: Philippe Joseph, Carpentras; Jean-Pierre Mettei, La Varenne, both of France

[73] Assignees: S.A.M.M., Bievres; Alkan, Valenton, both of France

[21] Appl. No.: 378,872

[22] Filed: Jul. 12, 1989

[30] Foreign Application Priority Data

Jul. 12, 1988 [FR] France .................. 88 09484

[51] Int. Cl.⁵ .................. B60G 11/14; F16F 1/10
[52] U.S. Cl. .................. 267/275; 267/156; 280/717; 280/722
[58] Field of Search .................. 267/33, 156, 157, 199, 267/275; 188/306; 280/705, 700, 722, 715, 716, 717

[56] References Cited
U.S. PATENT DOCUMENTS

| | | | |
|---|---|---|---|
| 1,646,583 | 10/1927 | Hassler | 267/199 |
| 2,158,028 | 5/1939 | Burke | 267/275 X |
| 2,714,517 | 8/1955 | Powell | 280/710 |
| 4,254,970 | 3/1981 | Petrick | 280/705 |
| 4,483,426 | 11/1984 | Ta Gawa et al. | 267/156 X |

FOREIGN PATENT DOCUMENTS 509562 10/1928 Fed. Rep. of Germany ...... 267/156
858815 12/1940 France .

Primary Examiner—Robert J. Oberleitner
Attorney, Agent, or Firm—Sughrue, Mion, Zinn, Macpeak & Seas

[57] ABSTRACT

This device comprises an arm (15) for supporting the load, such as a roller member of a vehicle, articulated about a bearing axle (2), together with a resilient leaf (1) forming a spiral about the axle (2) and a cushioning strip (12) of an elastomeric material interposed between two consecutive turns (1c, 1d, 1e) of the leaf (1); the inner end of the leaf (1) is rigidly fixed to the bearing axle (2) and its outer end (1b) is fixed to the arm (15), these resilient members (1, 12) preferably being accommodated within the arm (15) in a leaktight housing 15a). Cooling element (14, 26) including a liquid which fills the housing (15a) to ensure the cooling of the suspension. The latter is entirely independent and of minimum bulk, and can be used in any terrain by virtue of the cooling element.

6 Claims, 2 Drawing Sheets

DEVICE FOR THE RESILIENT AND CUSHIONED SUSPENSION OF A LOAD PARTICULARY FOR A VEHICLE

The present invention relates to a device for the resilient and cushioned suspension of a load. This device thus relates in a general manner to all cases where, in the mechanical engineering industry, a resilient and cushioned connection between two members is required.

However, this device relates principally to the suspension of all wheeled or tracked vehicles. It can however likewise apply to the resilient isolation between a member and a support, relative to shaking or vibrations, for example for the support of fragile measuring instruments.

It is known, in these various fields, to make use simultaneously of the resilience of metals or other bodies having a high modulus of elasticity, and the internal cushioning of deformable elastomers having a low modulus of elasticity. (High modulus is understood to mean as high as approximately 200,000 megapascals, and low modulus approximately 30 to 100 megapascals.) For example, use is thus made of moulded helical springs in rubber tubes for linear-travel suspensions.

These known embodiments possess the following disadvantages: on the one hand they require ancillary mechanical systems (linkages) to provide the suspension kinematics. On the other hand, they have no means of dissipating heat energy, which restricts their suitability for off-highway use.

The object of the invention is to provide a suspension device in which these disadvantages are eliminated.

The resilient and cushioned suspension device forming the subject of the invention, which can be used particularly in a vehicle, is of the type possessing a load supporting art articulated about a bearing axle, together with resilient means interacting with this arm.

According to the invention, this device is characterized in that the said means comprise an elastic leaf having a high modulus of elasticity and forming a spiral about an axle parallel to the axis of oscillation, as well as a cushioning strip of a deformable material having a low modulus of elasticity, which may or may not be compressible, interposed between two consecutive turns of the leaf.

The resilient leaf is subjected to flexural stress, while the cushioning strip, preferably made from an elastomer, associated with this leaf possesses substantial interior cushioning and is subjected to compressive and shearing stresses.

Such a suspension member is entirely independent and consequently requires no ancillary mechanical system.

According to an advantageous feature of the invention, the resilient leaf and the compressible strip are accommodated within the oscillating arm, in a leaktight housing. This arrangement thus eliminates any consumption of space by the suspension outside the oscillating arm.

According to other features of the invention:

Free annular channels are formed in the cushioning strip.

The cushioning strip contains means of thermal conduction, comprising for example a spiral spring embedded in the deformable material, applied against a concave face of the resilient leaf, preferably positioned opposite the free annular channels and interacting with the leaf to support the load.

The means of thermal conduction likewise comprise a metal plate in contact with the leaf and/or with the cushioning strip.

The resilient leaf is accommodated in a hoop in which an outlet aperture is made for the outer end of the leaf, and which is fitted internally with an elastomer pad.

The outer end of the leaf is folded back into a loop which surrounds a pin passing through the arm and fixed thereto, and its inner end is fixed to a journal which passes through the arm and forms the bearing axle.

The invention will now be described with reference to the attached drawings which, by way of nonlimiting example, illustrate an embodiment thereof.

Figure 1:
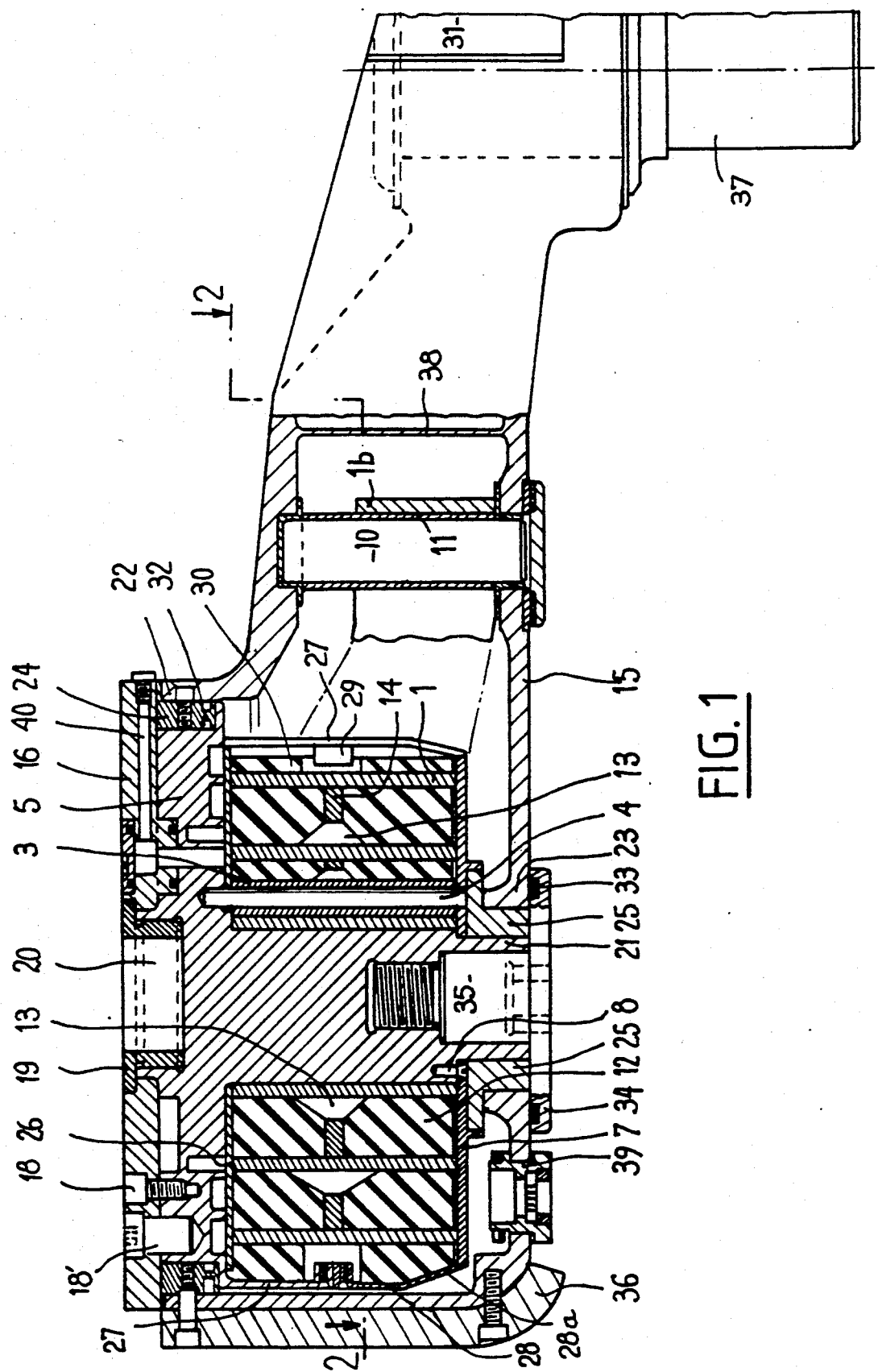
FIG. 1 is a sectional view along 1/1 in FIG. 2 of an embodiment of the suspension device according to the invention.
Figure 2:
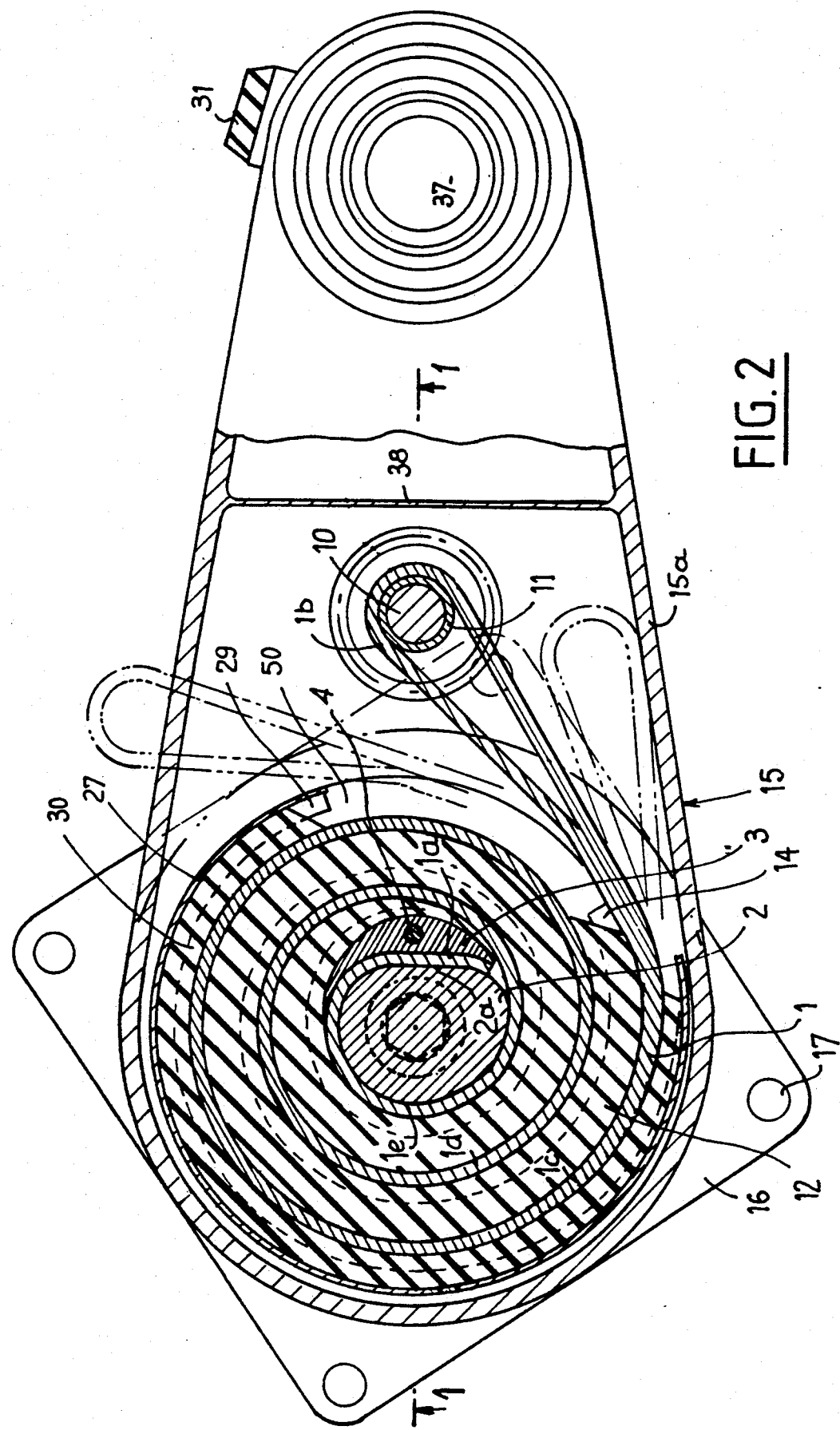
FIG. 2 is a view in section and partial elevation along 2/2 in FIG. 1.

The resilient and cushioned suspension device shown in FIGS. 1 and 2, intended in particular for a wheeled or tracked vehicle, comprises an arm 15 for supporting a load (not shown), supported by the suspension, for example a wheel or a track roller mounted on a terminal hub 37. The arm 15 is articulated about a bearing axle 2 fixed to a chassis (not shown) and forming the bearing axle of the suspension.

The device likewise comprises resilient means associated with the arm 15 and comprising on the one hand a resilient leaf 1 forming a spiral about the bearing axle 2, and on the other hand a cushioning strip 12 of elastomeric material, preferably but not necessarily compressible, interposed between two consecutive turns ($1c$–$1d$, $1d$–$1e$) of the leaf 1, the number of turns of the latter being not limited to the disclosed embodiment.

The inner end $1a$ of the spiral leaf 1 is rigidly fixed to the bearing axle 2, while its outer end $1b$ is mechanically connected to the arm 15. Thus, in the example described, the fixing of the end $1a$ to the bearing axle 2 comprises a lug 3 retained by a transverse pin 4 passing through a shoulder 5 of the bearing axle 2, and a plate 7 fixed to the latter by screws 8, between the lug 3 and a flattened portion $2a$ of the bearing axle 2.

Its outer end $1b$ may, for example, be folded back into a loop which surrounds a pin 10 passing through the arm 15 and fixed thereto. This pin 10 may or may not be supplemented by an anti-friction bush 11 and receives the forces from the suspension of the vehicle, if the device is mounted on a vehicle.

The resilient strip 12 is arranged between the substantially equidistant parts of the turns $1c$, $1d$, $1e$ of the leaf 1 and substantially fills the space between these turns. The strip 12 may be bonded to the convex face and/or to the concave face of each turn.

The resilient leaf 1 is accommodated in a hoop 27, 28 in which an outlet aperture 50 is made for the outer end $1b$ of the leaf 1, and which is fitted internally with an elastomer pad 30. One half of the hoop is formed here by an extension 27 of the bearing axle 2, and the other half by an extension 28 of the plate 7, this extension comprising a conical part $28a$ which is constricted to facilitate the introduction of the resilient assembly and of the bearing axle 2 inside the arm 15. This introduction is likewise facilitated by a transverse offset (cf. FIG. 1) of the outer end $1a$ of the leaf 1. The latter extends from the turn $1c$ to the outside of the hoop 27, 28, through the aperture 50, which enables the arm 15 to perform an oscillation of maximum amplitude whose limits are shown by the end positions, in dot-and-dash lines, of the loop 1b. A rigid blade 29 placed inside the hoop 27 acts as a stop at the end of the release of the suspension.

The assembly of members described above is arranged within a seating defined by a leaktight housing 15a of the arm 15, limited by a transverse wall 38 placed between the pin 10 and the hub 37. This housing is filled with an appropriate cooling fluid, in which are immersed the resilient leaf 1, the elastomer 12 and the pin 10, in particular, and which can be introduced via a duct 40 (FIG. 1) made in a wall of the housing 15a. An eyepiece 39 provided on the housing 15a makes it possible to check the level of the cooling fluid.

Free annular channels 13 are made in the cushioning strip 12 and may have, for example, a frustoconical section as shown. Moreover, the strip 12 contains means of thermal conduction, specifically, in the example described, a spiral spring 14 of slight transverse thickness placed between the turns 1c, 1d, 1e, embedded in the elastomeric material of the strip 12, and preferably applied against a concave face of the leaf 1. The spiral spring 14 is preferably positioned opposite the annular channels 13, in order to obtain a technical effect which will be explained hereinafter.

The heat conduction means may likewise advantageously comprise a metal plate 26, for example made of copper, placed in contact with the leaf 1 and/or with the strip 12 to diffuse the heat towards the bearing axle 2. The latter may itself comprise circulation ducts (not shown) for the cooling fluid.

The device can be provided with cushioning or free external stops, such as the stop 31 placed on the free end of the arm 15. These stops limit the oscillation of the said arm, by coming into contact with the chassis of the vehicle.

The bearing axle 2 is connected to the vehicle (not shown) via a flange 16 which is itself fixed by holes 17 to bolts (not shown) carried by a flank of the vehicle. Screws 18, screwed into threaded holes in the bearing axle 2, ensure that the flange 16 is supported on the latter. Studs 18' screwed into the flange 16 and interacting with holes bored in the bearing axle 2 lock the latter at the desired angle for the operation of the suspension. Adjustment is facilitated by a nut 19 screwed and flush-fitted into the bearing axle 2 and comprising an inner recess 20. The latter may be, for example, a hexagon socket for receiving a tool for measuring the torque and the angle of the arm 15 after assembly of the spring formed by the components 1, 12 and 14. The bearing axle 2 comprises two shoulders 5 and 21 which receive bores 22 and 23 of the arm 15, via friction rings 24 and 25, to form two rocker bearings for the arm 15.

The housing 15a can be formed from any welded or moulded material. Preferably, it is made from a composite material based on resin and carbon fibres, in a manner such as to possess a minimum weight which improves the efficiency of the suspension of the vehicle. The resilient leaf 1 can be formed from a composite material of the same type, adapted in this case to resist the traction forces exerted by the pin 10.

FIG. 1 likewise shows rotary sealing joints 32 and 33 between the arm 15 and the bearing axle 2, the second joint 33 being mounted by a nut 34 which also fixes the arm 15 on the bearing axle 2 by means of an intermediate screw 35. Furthermore, a protective casing 36 is fixed on the end of the arm 15 opposite the hub 37, in order to protect the arm against any impacts which may occur during the off-highway use of a vehicle.

The mode of operation and the technical advantages of the suspension device which has just been described are as follows.

During the oscillations of the arm 15, and of the rolling member mounted on its hub 37, about the fixed axis formed by the bearing axle 2, the limits of which are determined by the width of the aperture 50 in the hoop 27, 28, the elasticity of the leaf 1 absorbs these oscillations, which can be further cushioned by the strip 12. The material forming the latter may, moreover, not be compressible, in which case the strip 12 will function solely as a stop in respect of the leaf 1. In the event that the material selected for the strip 12 is compressible, this strip further cushions the oscillations of the arm 15. The elastomeric pad 30 acts when the suspension is released, since this pad 30 is in contact with the outer turn 1c.

In the example described, the axis of oscillation of the arm 15 coincides with the fixed bearing axle 2, since it would in fact be possible, as an alternative embodiment, to arrange for these two members to be separate. In the example described, the outer end 1b of the spiral leaf 1 can then form a loop gripping the pin 10, in a manner such that the rotation of the arm 15 in the direction which rolls up the leaf 1 (anti-clockwise in FIG. 2) exerts a traction force on the latter. The effect of this is to retighten the spiral on itself, and thus to accentuate the compression of the elastomeric strip 12 between the turns.

The spiral arrangement of the resilient leaf 1, which is thermally more conductive than the cushioning strip 12, provides a large relative thermal exchange surface between these two members, and consequently encourages heat transmission.

The channels 13, provided within the elastomer or alternatively laterally, facilitate its deformation under load and thus increase its flexibility while reducing its internal stresses. In the event that a heat exchange liquid is used, such channels 13 improve the contact with this liquid, and by their changes in volume bring about a circulation of the fluid, which increases the convective effect.

The spiral spring 14, preferably contiguous with the channels 13, cooperates on the one hand in the resilient action of the suspension of the vehicle in the direction which unrolls the spiral, and on the other hand forms a stop between the opposing faces of the turns 1c, 1d, 1e when the strip 1 is rolled up to the maximum under the effort of the suspension. During this rolling-up effort, caused by the action of the pin 10, the elastomer forming the strip 12 is compressed, and can moreover become deformed under the resulting pressure, occupying the empty spaces formed by the channels 13. In a situation of maximum compression of the strip 12, the channels 13 have disappeared and the spring 14 abuts against the convex surface of the turns defining the channels 13.

The cushioning pad 12, 30 is subject to internal heating as a result of its successive deformations in operation. The fact of enclosing it, according to a special feature of the invention, within a leaktight housing 15a filled with a suitable liquid ensures that it is cooled by convection of the heat released to the outer walls of this housing 15a. The latter advantageously forms part of the oscillating arm 15 of the suspension.

It is appropriate to note that the spring 14 provides not only the stop function already mentioned but also a heat conduction function, allowing an increase in the heat exchange between the cushioning strip 12 and the outside.

We claim:

1. Device for the resilient and cushioned suspension of a load, particularly for a vehicle, comprising:
    an oscillating arm (15) for supporting the load, said oscillating arm being articulated about a bearing axle (2);
    resilient means interacting with said oscillating arm and comprising a resilient leaf (1) having a high modulus of elasticity and forming a spiral about an axis parallel to the axis of oscillation of said oscillating arm (2), and a damping strip (12) of deformable material having a low modulus of elasticity, said damping strip being interposed between two consecutive turns (1c, 1d, 1e) of the leaf (1), the leaf and the damping strip (12) being accommodated in a leaktight housing (15a) of the oscillating arm (15), wherein the housing (15a) of the arm (15) is filled with non-lubricant cooling liquid in which said leaf and damping strip are immersed.

2. Device according to claim 1, characterized in that a free annular channel (13) is formed in the damping strip for guiding the flow of cooling liquid.

3. Device according to claim 2, characterized in that the damping strip (12) contains means of thermal conduction, comprising a spiral spring (14) embedded in the deformable material (12), applied against a concave face of the resilient leaf (1), and positioned opposite the free annular channel (13) and interacting with the leaf (1) to support the load.

4. Device according to claim 3, characterized in that the thermal conduction means further comprises a metal plate (26) in contact with at least one of the leaf (1) and the damping strip (12).

5. Device according to claims 1, 2, 3, or 4, further comprising a hoop (27, 28), and an outlet aperture (50), characterized in that the resilient leaf (1) is accommodated in said hoop (27, 28), and said outlet aperture (50) is provided for an outer end (1b) of the leaf (1).

6. Device according to claim 5, further comprising a deformable pad (30), and wherein said hoop is internally fitted with said deformable pad.

* * * * *